United States Patent
Tomioka

(10) Patent No.: US 7,497,951 B2
(45) Date of Patent: Mar. 3, 2009

(54) COMPOSITE SEMIPERMEABLE MEMBRANE, PRODUCTION PROCESS THEREOF, AND ELEMENT, FLUID SEPARATION EQUIPMENT AND METHOD FOR WATER TREATMENT USING THE SAME

(75) Inventor: Hiroki Tomioka, Shiga (JP)

(73) Assignee: Toray Industries, Inc., Tokyo (JP)

( * ) Notice: Subject to any disclaimer, the term of this patent is extended or adjusted under 35 U.S.C. 154(b) by 119 days.

(21) Appl. No.: 11/665,260

(22) PCT Filed: Oct. 28, 2005

(86) PCT No.: PCT/JP2005/020254

§ 371 (c)(1),
(2), (4) Date: Apr. 12, 2007

(87) PCT Pub. No.: WO2006/046081

PCT Pub. Date: May 4, 2006

(65) Prior Publication Data

US 2007/0284309 A1 Dec. 13, 2007

(30) Foreign Application Priority Data

Oct. 29, 2004 (JP) ............... 2004-315955

(51) Int. Cl.
- *B01D 63/00* (2006.01)
- *B01D 39/00* (2006.01)
- *B32B 7/04* (2006.01)
- *B05D 5/00* (2006.01)

(52) U.S. Cl. ............... 210/652; 210/500.38; 210/490; 210/321.6; 428/420; 427/244; 427/245

(58) Field of Classification Search ............ 210/500.38, 210/490, 652, 321.6; 428/420; 427/244, 427/245

See application file for complete search history.

(56) References Cited

U.S. PATENT DOCUMENTS

| | | | | |
|---|---|---|---|---|
| 4,277,344 A | * | 7/1981 | Cadotte | 210/654 |
| 4,758,343 A | * | 7/1988 | Sasaki et al. | 210/500.28 |
| 4,761,234 A | | 8/1988 | Uemura et al. | |
| 4,765,897 A | * | 8/1988 | Cadotte et al. | 210/500.23 |
| 4,830,885 A | * | 5/1989 | Tran et al. | 427/245 |
| 5,051,178 A | | 9/1991 | Uemura et al. | |
| 5,152,894 A | | 10/1992 | Haubs et al. | |
| 5,160,619 A | | 11/1992 | Yamaguchi et al. | |
| 5,173,191 A | * | 12/1992 | Black | 210/654 |
| 5,182,024 A | * | 1/1993 | Chen | 210/654 |
| 5,435,918 A | * | 7/1995 | Welmers et al. | 210/634 |
| 5,503,666 A | * | 4/1996 | Mennicke et al. | 106/31.43 |
| 5,582,725 A | * | 12/1996 | McCray et al. | 210/490 |
| 6,300,026 B1 | | 10/2001 | Yamazaki et al. | |

(Continued)

FOREIGN PATENT DOCUMENTS

EP      0 432 358 A1    6/1991

(Continued)

*Primary Examiner*—Ana M Fortuna
(74) *Attorney, Agent, or Firm*—Oliff & Berridge, PLC

(57) ABSTRACT

A composite semipermeable membrane, which comprises a separating functional layer comprising polyamide formed on a porous substrate film, wherein the separating functional layer comprising polyamide has a mean pore radius of 0.25 nm to 0.35 nm and a vacancy content of 0.2 $nm^3$% to 0.3 $nm^3$%, measured by positron annihilation lifetime spectroscopy.

14 Claims, 2 Drawing Sheets

U.S. PATENT DOCUMENTS

| | | | |
|---|---|---|---|
| 6,709,590 B1 * | 3/2004 | Hirose | 210/500.38 |
| 6,805,796 B2 * | 10/2004 | Hirose et al. | 210/321.76 |
| 6,821,480 B2 * | 11/2004 | Suddath et al. | 422/26 |
| 7,279,097 B2 * | 10/2007 | Tomioka et al. | 210/500.38 |

FOREIGN PATENT DOCUMENTS

| | | |
|---|---|---|
| EP | 1 488 846 A1 | 12/2004 |
| JP | A 01-180208 | 7/1989 |
| JP | A 02-115027 | 4/1990 |
| JP | A 11-019493 | 1/1999 |
| JP | A 11-169689 | 6/1999 |
| JP | B2 3031763 | 2/2000 |
| JP | A 2001-142233 | 5/2001 |
| JP | A 2001-259388 | 9/2001 |

* cited by examiner

COMPOSITE SEMIPERMEABLE MEMBRANE, PRODUCTION PROCESS THEREOF, AND ELEMENT, FLUID SEPARATION EQUIPMENT AND METHOD FOR WATER TREATMENT USING THE SAME

TECHNICAL FIELD

The present invention relates to a composite semipermeable membrane useful for selective separation of a liquid mixture, and to a production process thereof. For example, the present invention relates to a composite semipermeable membrane which comprises a separating functional layer comprising polyamide formed on a porous substrate film and which is favorable for removing boron from seawater or brackish water, and to a production process thereof.

BACKGROUND ART

Recently, desalting seawater through a composite semipermeable membrane has been tried, and now, it has been put into practical use in water plants all over the world. A composite semipermeable membrane generally comprises a separating functional layer coated on a porous substrate film. When the separating functional layer is formed by using crosslinked aromatic polyamide, there are such advantages that the layer is stiff and rigid since it contains a benzene ring and that the layer can be readily formed by interfacial polycondensation of aromatic polyfunctional amine and aromatic polyfunctional acid halide, and other advantages such as a high salt removal ratio and a high permeation flow rate are known (JP-A-1-180208 and JP-A-2-115027).

However, the water quality standard in the art is controlled more and more severely these days. In particular, it is difficult to reduce the minor boron in seawater to a level acceptable for drinking water in ordinary treatment, and some composite semipermeable membranes have been proposed for solving this problem (JP-A-11-19493 and JP-A-2001-259388). However, since these membranes are expected to have a membrane permeation flow rate of 0.5 $m^3/m^2 \cdot day$ or less and a boron removal ratio at most about 91 to 92% when seawater at 25° C. having a pH of 6.5, a boron concentration of 5 ppm and a TDS concentration of 3.5% by weight is permeated under an operation pressure of 5.5 MPa, development of composite semipermeable membranes which have higher solute-rejection performance has been desired.

In order to improve the solute-rejection performance of a composite semipermeable membrane, it might be considered to make the pore size of the separating functional layer of the composite semipermeable membrane small. However, at the same time, to achieve sufficient water permeation capability, it is necessary to make the pore size appropriately large. On the other hand, it is considered that, even if the pore size in the separating functional layer of the composite semipermeable membrane is small, when the pore number and the vacancy content in the semipermeable membrane are large, the permeated water volume increases but the solute-rejection performance deteriorates. In other words, in order to improve the solute-rejection performance and maintain the permeated water volume, both of the pore size and the vacancy content in the separating functional layer of the composite semipermeable membrane must be appropriately regulated. As one means for measuring the pore size distribution and the vacancy content in a thin membrane, there is conventionally disclosed a method using positron annihilation lifetime spectroscopy. (JP-A-2001-142233 and JP-A-11-169689). But, since the correlation between the pore radius as well as the vacant content and the solute removal ratio has not been found with these method, an indicator representing the boron removal performance of the composite semipermeable membrane has not been obtained so far.

As means for improving the solute-rejection performance of composite semipermeable membranes, a method in which a novel reactant is added to the reaction solution is exemplified. Since this method does not so much differ from conventional methods, it is useful as a simple improved method. For example, it is described that in the composite semipermeable membrane, crosslinked polyamide is constituted by a polyamine component having at least two amino groups in the molecule, and an acid component, as a novel reactant, which comprises a linear aliphatic poly-acid halide having at least two halogenocarbonyl groups in the molecule (Japanese Patent 3,031,763). Although it is described that the method provides a composite semipermeable membrane having a high salt removal ratio and a high permeation flow rate and a production process thereof, it is still impossible to further increase the boron rejection ratio according to the method.

DISCLOSURE OF THE INVENTION

An object of the present invention is to provide a composite semipermeable membrane having a high salt removal ratio and high rejection performance for even substances non-dissociative in a neutral region such as boric acid, and to provide a production process thereof.

In order to accomplish the above and other objects, the present invention provides the followings:

(I) A composite semipermeable membrane, which comprises a separating functional layer comprising polyamide formed on a porous substrate film, wherein the separating functional layer comprising polyamide has a mean pore radius of 0.25 nm to 0.35 nm and a vacancy content of 0.2 $nm^3$% to 0.3 $nm^3$%, measured by positron annihilation lifetime spectroscopy.

(II) A composite semipermeable membrane, which comprises a separating functional layer comprising polyamide formed on a porous substrate film, wherein an acyl group selected from formulae (1) to (3) is bound via a covalent bond to a polyamide molecule in the separating functional layer comprising polyamide:

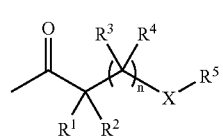

(1)

wherein n represents 0 or 1; X represents O, S or $NR^6$; $R^1$, $R^2$ and $R^6$ each represents a hydrogen atom or an alkyl group having from 1 to 3 carbon atoms, and at least one of $R^1$ and $R^2$ is a hydrogen atom; $R^3$ and $R^4$ each represents a hydrogen atom, or an alkyl group having from 1 to 12 carbon atoms or aromatic group which may have a substituent(s) other than a carboxyl group; $R^5$ represents an alkyl group having from 1 to 12 carbon atoms or aromatic group which may have a substituent(s) other than a carboxyl group; and any atoms of $R^1$, $R^3$, $R^5$ and $R^6$ may form a ring structure via a covalent bond,

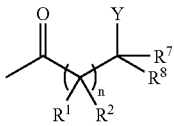

(2)

wherein n, $R^1$ and $R^2$ have the same meanings as defined above; Y represents a halogen atom; $R^7$ and $R^8$ each represents a hydrogen atom, a halogen atom, or an alkyl group having 1 to 12 carbon or aromatic group which may have a substituent(s) other than a carboxyl group; and atoms of $R^1$ and $R^7$ may form a ring structure via a covalent bond, and

(3)

wherein $R^9$ represents a 5-membered ring aromatic group having 1 to 12 carbon atoms, has at least two atoms selected from a nitrogen atom, an oxygen atom and a sulfur atom within the ring and may have a substituent(s) other than a carboxyl group.

(III) The composite semipermeable membrane according to (I),
wherein an acyl group selected from formulae (1) to (3) is bound via a covalent bond to a polyamide molecule in the separating functional layer comprising polyamide:

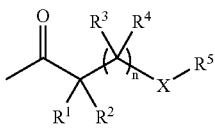

(1)

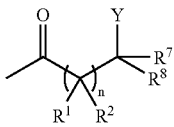

(2)

(3)

wherein n, X, Y and $R^1$ to $R^9$ have the same meanings as those defined in (II).

(IV) The composite semipermeable membrane according to (I) or (II), wherein the separating functional layer comprising polyamide comprises crosslinked polyamide formed by means of interfacial polycondensation by contacting, on the porous substrate film, an aqueous solution comprising polyfunctional amine, and an organic solvent solution comprising polyfunctional acid halide and acid halide selected from the following formulae (4) to (6):

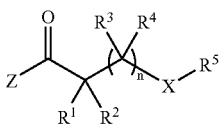

(4)

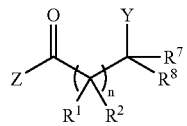

(5)

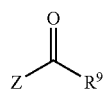

(6)

wherein n, X, Y and $R^1$ to $R^9$ have the same meanings as those defined in (II); and Z represents a halogen atom.

(V) The composite semipermeable membrane according to (I) or (II), wherein the separating functional layer comprising polyamide comprises crosslinked polyamide formed by means of interfacial polycondensation by contacting, on the porous substrate film, an aqueous solution comprising polyfunctional amine, an organic solvent solution comprising polyfunctional acid halide, and an organic solvent solution comprising acid halide selected from formulae (4) to (6) in (IV).

(VI) The composite semipermeable membrane according to (IV), wherein the acid halide selected from formulae (4) to (6) is at least one selected from the group consisting of methoxyacetyl chloride, ethoxyacetyl chloride, phenyloxyacetyl chloride, 2-methylphenyloxyacetyl chloride, 2-ethylphenyloxyacetyl chloride, (4-chlorophenyl)oxyacetyl chloride, (phenylthio)acetyl chloride, benzyloxyacetylchloride, 2-fluoropropionyl chloride, 2-chloropropionyl chloride, 2-bromopropionyl chloride, heptafluorobutyryl chloride, acetoxyacetyl chloride, trifluoroacetyl chloride, trichloroacetyl chloride, (−)-menthyloxyacetyl chloride, and isoxazole-5-carbonyl chloride.

(VII) The composite semipermeable membrane according to (V), wherein the acid halide selected from formulae (4) to (6) is at least one selected from the group consisting of methoxyacetyl chloride, ethoxyacetyl chloride, phenyloxyacetyl chloride, 2-methylphenyloxyacetyl chloride, 2-ethylphenyloxyacetyl chloride, (4-chlorophenyl)oxyacetyl chloride, (phenylthio)acetyl chloride, benzyloxyacetylchloride, 2-fluoropropionyl chloride, 2-chloropropionyl chloride, 2-bromopropionyl chloride, heptafluorobutyryl chloride, acetoxyacetyl chloride, trifluoroacetyl chloride, trichloroacetyl chloride, (−)-menthyloxyacetyl chloride, and isoxazole-5-carbonyl chloride.

(VIII) The composite semipermeable membrane according to (I) or (II), which satisfies the following relationship when seawater at 25° C. having a pH of 6.5, a boron concentration of 5 ppm and a TDS concentration of 3.5% by weight is permeated under an operation pressure of 5.5 MPa:

Boron removal ratio (%)≧96−4×membrane permeation flow rate ($m^3/m^2$·day).

(IX) The composite semipermeable membrane according to (I) or (II), which has a membrane permeation flow rate of 0.5 $m^3/m^2$·day or more and a boron removal ratio of 94% or more, when seawater at 25° C. having a pH of 6.5, a boron concentration of 5 ppm and a TDS concentration of 3.5% by weight is permeated under an operation pressure of 5.5 MPa.

(X) The composite semipermeable membrane according to (I) or (II), which has a TDS transmission coefficient of $0.1 \times 10^{-8}$ m/s to $3 \times 10^{-8}$ m/s, when seawater at 25° C. having a pH of 6.5, a boron concentration of 5 ppm and a TDS concentration of 3.5% by weight is permeated under an operation pressure of 5.5 MPa.

(XI) A process for producing the composite semipermeable membrane according to (I) or (II), which comprises:

contacting an aqueous solution comprising polyfunctional amine which has at least two primary and/or secondary amino groups, with a porous substrate film, contacting a solution of a water-immiscible organic solvent comprising polyfunctional acid halide having at least two acid halide groups to thereby form, on the porous substrate film, a separating functional layer comprising crosslinked polyamide by means of interfacial polycondensation, and contacting an organic solvent solution comprising the acid halide selected from formulae (4) to (6) in (IV) at an amount of 5 mol % or more per the polyfunctional acid halide with the separating functional layer.

(XII) A process for producing the composite semipermeable membrane according to (I) or (II), which comprises:

contacting an aqueous solution comprising polyfunctional amine which has at least two primary and/or secondary amino groups, with a porous substrate film, contacting a solution of a water-immiscible organic solvent comprising polyfunctional acid halide having at least two acid halide groups and the acid halide selected from formulae (4) to (6) in (IV) at an amount of 1 to 50 mol % per the polyfunctional acid halide to thereby form, on the porous substrate film, a separating functional layer comprising crosslinked polyamide by means of interfacial polycondensation.

(XIII) A composite semipermeable membrane element which comprises the composite semipermeable membrane according to (I) or (II).

(XIV) A fluid separation equipment which comprises the composite semipermeable membrane element according to (XIII).

(XV) A method for water treatment, which comprises using the composite semipermeable membrane according to (I) or (II).

BEST MODE FOR CARRYING OUT THE INVENTION

Figure 1:
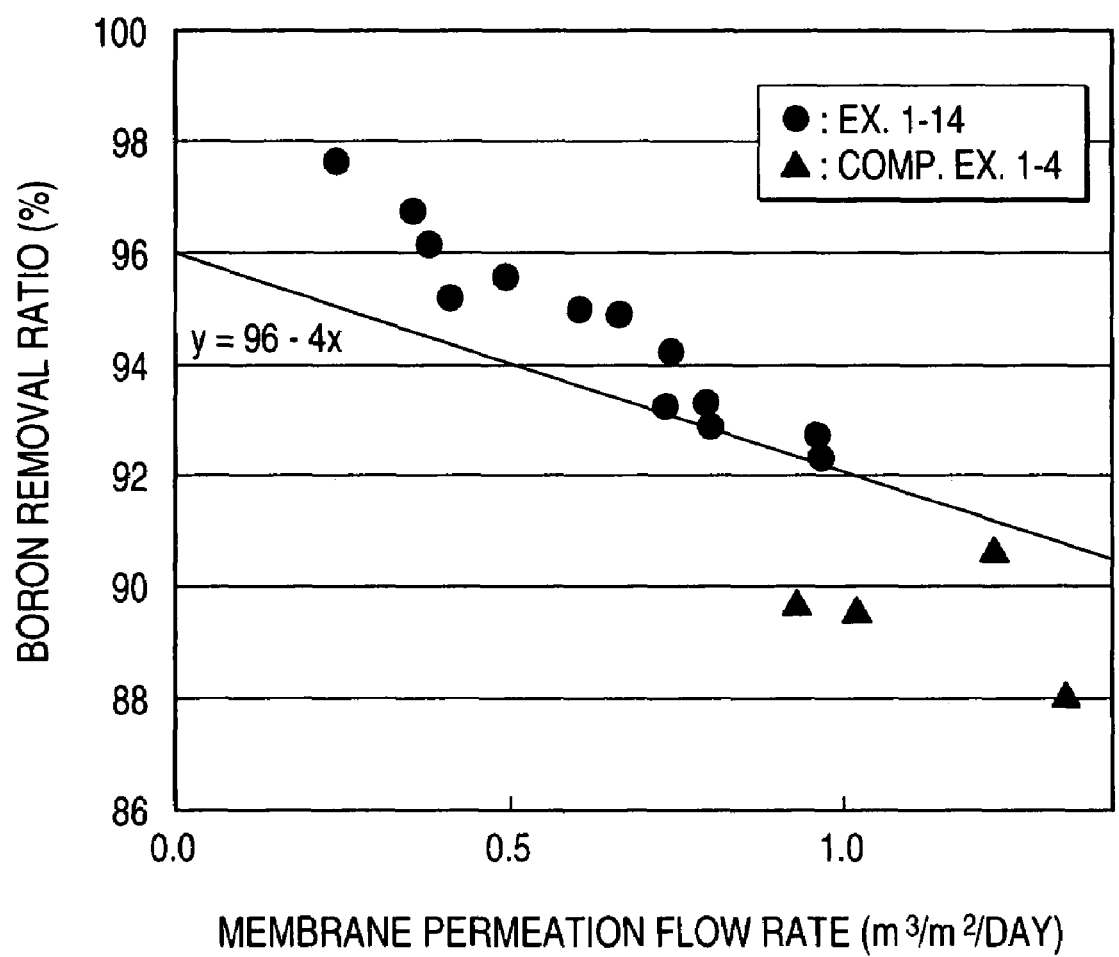
FIG. 1 is a graph showing the relationship between the membrane permeation flow rate and the boron removal ratio of the membranes produced in Examples 1 to 25 and Comparative Examples 1 to 4.

The present invention provides a composite semipermeable membrane which has high salt removal performance and can reject even substances, at a high removal ratio, which are non-dissociative in a neutral region and are therefore hardly removed to a high extent with conventional reverse osmosis membranes. Accordingly, since the composite semipermeable membrane can reject boron, at a high removal ratio, which is heretofore hardly removed to a high extent, particularly in desalting of seawater, it can be suitably used for preparation of drinking water by reverse osmosis.

The composite semipermeable membrane of the present invention is characterized in that the separating functional layer of the composite semipermeable membrane has a mean pore radius of 0.25 nm to 0.35 nm and a vacancy content of 0.2 $nm^3$% to 0.3 $nm^3$%, measured by positron annihilation lifetime spectroscopy.

The positron annihilation lifetime spectroscopy is a technique in which the period from the incidence of a positron in a sample to the annihilation thereof (in the order of several hundred picosec to several ten nanosec) is measured and information such as the size of the pores in the range of 0.1 to 10 nm, number density thereof and size distribution thereof is nondestructively evaluated based on the annihilation lifetime. Details of such measurements are described in, for example, *Jikken Kagaku Koza (Experimental Chemistry Course)*, 4th edition, Vol. 14, p. 485, edited by The Chemical Society of Japan; Maruzen (1992).

This method is classified into two types depending on the kind of the positron beam source. One is $^{22}$Na method uses a radioactive isotope ($^{22}$Na), and the method is suitable for the pore evaluation of resin, powder, fiber, fluid, etc. Another is a positron beam method using positron beam emitted from an electron beam-type accelerator as the positron beam source, and the method is useful for pore evaluation for thin films with a thickness of about several hundred nm formed on various substrates. Particularly, the latter positron beam method is more preferred as the measuring method for the separating functional layer of a composite semipermeable membrane, because, even in the case where a composite semipermeable membrane is a sample to be measured, the separating functional layer can be measured only by maintaining the sample in a dry state, not requiring any special processing such as separation of the separating functional layer from the composite semipermeable membrane.

In the positron beam method, the measuring zone in the depth direction from the sample surface is adjusted by the energy amount of the positron beam to be impinged on the sample. With the increase of energy, a deeper portion from the sample surface is included in the measuring zone, but the depth depends on the density of the sample. In the measurement of the separating functional layer of a composite semipermeable membrane, the zone with a depth of 50 to 150 nm from the sample surface is usually measured when a positron beam with energy of about 1 keV impinges. Also, for a separating functional layer with a thickness of about 150 to 300 nm, the central portion of the separating functional layer can be selectively measured.

A positron and an electron combine by the Coulomb force with each other to form a positronium Ps which is a neutral hydrogen-like atom. Ps contains para-positronium p-Ps and ortho-positronium o-Ps depending on the spins of the positron and electron being anti-parallel or parallel. The two species are formed in a ratio of 1:3 determined by spin statistics. The mean lifetime of each species is 125 ps for p-Ps and 140 ns for o-Ps, respectively. In a substance in an aggregated state, the probability for o-Ps overlapping with another electron than the one combined in itself, which phenomenon is called pickoff annihilation, increases, resulting in the reduction of the mean lifetime of o-Ps to several ns. Since the annihilation of o-Ps in an insulating material is due to the overlapping of o-Ps with the electron existing in the pore wall of the material, the smaller the pore size is, the more the annihilation speed increases. Namely, the annihilation lifetime τ of o-Ps can be related to the size of pores existing in an insulating material.

The annihilation lifetime τ due to the above-described pickoff annihilation of o-Ps can be derived from the analytical result of the fourth component obtained by dividing the positron annihilation lifetime curve measured by positron annihilation lifetime spectroscopy into four components in conformity with the non-linear least square program, POSITRONFIT (its details are described in, for example, P. Kierkegaard, et al, *Computer Physics Communications*, Vol. 3, p. 240, North Holland Publishing Co. (1972)).

The mean pore radius R in the separating functional layer of the composite semipermeable membrane of the present invention has been obtained by the following equation (7) based on the above-described positron annihilation lifetime τ. Equation (7) represents the relationship for the case of assuming that o-Ps is present in a pore with a radius R in an electron layer with a thickness of ΔR, whereby ΔR is empirically determined to be 0.166 nm (its details are described in Nakanishi et al: *Journal of Polymer Science*, Part B: Polymer Physics, Vol. 27, p. 1419, John Wiley & Sons, Inc. (1989).

$$\tau^{-1} = 2\left[1 - \frac{R}{R+\Delta R} + \frac{1}{2\pi}\sin\left(\frac{2\pi R}{R+\Delta R}\right)\right] \quad (7)$$

The vacancy content in the separating functional layer of the composite semipermeable membrane of the present invention can be obtained by the following method. Assuming that the mean pore radius of the separating functional layer of the composite semipermeable membrane obtained by the above-described method is R (nm), the sphere-approximated mean pore volume V (nm³) can be represented as V=(4πR³)/3. From this volume, the vacancy content (nm³%) in the separating functional layer of the composite semipermeable membrane can be represented by V×I. Here, I is the ratio (%) of o-Ps relative to the total impinging number of positron. Some use examples of the vacancy content V×I are disclosed, for example, in the above-described Nakanishi's literature, etc.

For a composite semipermeable membrane to have sufficient solute removing capability as well as permeated water volume, the mean pore radius is preferably from 0.25 nm to 0.35 nm. Also, a vacancy content of 0.2 to 0.3 nm³%, at the same time, is more preferred since such a composite permeable membrane exhibits a high removing ratio for a non-dissociated solute in the neutral region such as boric acid, and maintains a sufficient permeated water volume.

Also, the composite semipermeable membrane of the present invention is preferably a composite semipermeable membrane, which comprises a separating functional layer comprising polyamide formed on a porous substrate film, wherein an acyl group selected from formulae (1) to (3) is bound to a polyamide molecule in the separating functional layer comprising polyamide:

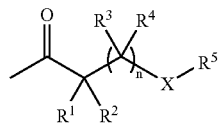

(1)

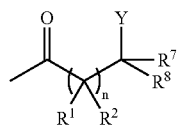

(2)

(3)

wherein n, X, Y and $R^1$ to $R^9$ have the same meanings as those defined above.

It is preferred that the polyamide in the separating functional layer is formed by interfacial polycondensation of polyfunctional amine, polyfunctional acid halide with acid halide having a hetero atom at the β- or γ-position of the carbonyl group, and that at least one of the polyfunctional amine and the polyfunctional acid halide contains a trifunctional or higher polyfunctional compound.

The thickness of the separating functional layer is generally from 0.01 to 1 μm, and preferably from 0.1 to 0.5 μm, in order to obtain sufficient separating performance and permeation water amount.

The polyfunctional amine means an amine having at least two primary and/or secondary amino groups in one molecule. Examples include aromatic polyfunctional amines in which at least two amino groups bind to the benzene ring at an ortho-, meta- or para-position, such as phenylenediamine, xylylenediamine, 1,3,5-triaminobenzene, 1,2,4-triaminobenzene, and 3,5-diaminobenzoic acid; aliphatic amines, such as ethylenediamine and propylenediamine; alicyclic polyfunctional amines, such as 1,2-diaminocyclohexane, 1,4-diaminocyclohexane, piperazine, 1,3-bispiperidylpropane, and 4-aminomethylpiperazine; and the like. Above all, aromatic polyfunctional amines having 2 to 4 primary and/or secondary amino groups in one molecule are preferred in view of the selective separability, permeability and heat resistance of the membrane. As the polyfunctional aromatic amines, preferred are m-phenylenediamine, p-phenylenediamine, and 1,3,5-triaminobenzene. Among these, m-phenylenediamine (hereinafter referred to as "m-PDA") is more preferred in view of the availability and handlability. These polyfunctional amines can be used alone or as a mixture thereof.

The polyfunctional acid halide means acid halide having at least two halogenocarbonyl groups in one molecule. Examples thereof include trifunctional acid halides, for example, trimesic acid chloride, 1,3,5-cyclohexanetricarboxylic acid trichloride, 1,2,4-cyclobutanetricarboxylic acid trichloride, and the like; and bifunctional acid halides, for example, aromatic bifunctional acid halides, such as biphenyldicarboxylic acid dichloride, azobenzenedicarboxylic acid dichloride, terephthalic acid chloride, isophthalic acid chloride, and naphthalenedicarboxylic acid chloride; aliphatic bifunctional acid halides, such as adipoyl chloride and sebacoyl chloride; alicyclic bifunctional acid halides, such as cyclopentanedicarboxylic acid dichloride, cyclohexanedicarboxylic acid dichloride, and tetrahydrofurandicarboxylic acid dichloride; and the like. In view of the reactivity with polyfunctional amine, the polyfunctional acid halide is preferably polyfunctional acid chloride. In view of the selective separability and the heat resistance of the membrane, preferred is polyfunctional aromatic acid chloride having 2 to 4 carbonyl chloride groups in one molecule. Above all, more preferred is trimesic acid chloride in view of the availability and handlability. These polyfunctional acid halides can be used alone or as a mixture thereof.

The composite semipermeable membrane, which comprises a separating functional layer comprising polyamide formed on a porous substrate film, wherein an acyl group selected from formulae (1) to (3) is bound to a polyamide molecule in the separating functional layer comprising polyamide as produced by the above is preferred, because the separating functional layer comprising polyamide has a mean pore radius of 0.25 nm to 0.35 nm and a vacancy content of 0.2 nm³% to 0.3 nm³%, measured by positron annihilation lifetime spectroscopy, so that the composite semipermeable membrane provides high boron removal performance.

Also, the method for allowing the acyl group selected from formulae (1) to (3) to be present in the separating functional layer is not particularly limited. For example, the acyl group can be allowed to be present via a covalent bond in the separating functional layer by contacting an acid halide solution selected from the following formulae (4) to (6) on the surface of the separating functional layer formed by interfacial polycondensation of polyfunctional amine and polyfunctional acid halide, or by allowing acid halide selected from the following formulae (4) to (6) to coexist during interfacial polycondensation of polyfunctional amine and polyfunctional aromatic acid halide:

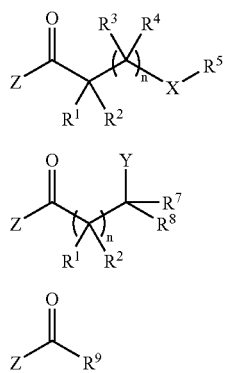

wherein n, X, Y, $R^1$ to $R^9$ and Z have the same meanings as those defined above.

That is, the formation of the separating functional layer comprising polyamide on the porous substrate film can be carried out by contacting the separating functional layer comprising polyamide with an aqueous solution of polyfunctional amine, an organic solvent solution of polyfunctional acid halide and an organic solvent solution of acid halide selected from the above formulae (4) to (6) on the porous substrate film for interfacial polycondensation, alternatively, by contacting the separating functional layer comprising polyamide with a polyfunctional amine solution and an organic solvent solution comprising polyfunctional acid halide and acid halide selected from the above formulae (4) to (6) on the porous substrate film for interfacial polycondensation. Particularly, the composite semipermeable membrane obtained by contacting the separating functional layer comprising polyamide with an aqueous solution of polyfunctional amine and an organic solvent solution comprising polyfunctional acid halide and acid halide selected from the above formulae (4) to (6) on the porous substrate film for interfacial polycondensation satisfies the relationship of "boron removal ratio (%)≧96−4×membrane permeation flow rate ($m^3/m^2$·day)" when seawater at 25° C. having a pH of 6.5, a boron concentration of 5 ppm and a TDS concentration of 3.5% by weight is permeated under an operation pressure of 5.5 MPa, and has a membrane permeation flow rate of 0.5 $m^3/m^2$·day or more and a boron removal ratio of 94% or more, so that the composite semipermeable membrane is preferred due to its high boron removal performance which has not been obtained before.

The acid halide selected from formulae (4) to (6) includes methoxyacetyl chloride, ethoxyacetyl chloride, phenyloxyacetyl chloride, 2-methylphenyloxyacetyl chloride, 2-ethylphenyloxyacetyl chloride, (4-chlorophenyl)oxyacetyl chloride, (phenylthio)acetyl chloride, benzyloxyacetylchloride, 2-fluoropropionyl chloride, 2-chloropropionyl chloride, 2-bromopropionyl chloride, heptafluorobutyryl chloride, acetoxyacetyl chloride, trifluoroacetyl chloride, trichloroacetyl chloride, (−)-menthyloxyacetyl chloride, and isoxazole-5-carbonyl chloride, which may be used alone or in combination of two or more thereof.

The composite semipermeable membrane thus obtained preferably has a TDS transmission coefficient of the membrane is preferably from $0.1 \times 10^{-8}$ m/s to $3 \times 10^{-8}$ m/s, when seawater at 25° C. having a pH of 6.5, a boron concentration of 5 ppm and a TDS concentration of 3.5% by weight is permeated under an operation pressure of 5.5 MPa. When the TDS transmission coefficient is within this range, the boron removal performance which is the effect of the present invention can be sufficiently obtained. The solute transmission coefficient can be obtained according to the method described below. The following formulae are known as reverse osmosis transportation equations based on non-equilibrium thermodynamics.

$$Jv = Lp(\Delta P - \sigma \cdot \Delta \pi) \quad (7)$$

$$Js = P(Cm - Cp) + (1 - \sigma)C \cdot Jv \quad (8)$$

Herein, Jv is a permeate flow volume through the membrane ($m^3/m^2/s$); Lp is a pure water transmission coefficient of the membrane ($m^3/m^2/s/Pa$); ΔP is the pressure difference on both sides of the membrane (Pa); σ is a solute reflection coefficient of the membrane; Δπ is an osmotic pressure difference on both sides of the membrane (Pa); Js is a solute membrane permeation flow rate ($mol/m^2/s$); P is a transmission coefficient of the solute (m/s); Cm is a solute concentration on the surface of the membrane ($mol/m^3$); Cp is a permeate concentration through the membrane ($mol/m^3$); and C is a concentration on both sides of the membrane ($mol/m^3$). The mean concentration C on both sides of the membrane does not have any substantial meaning when the concentration difference on both sides of the membrane is extremely large, such as the case of reverse osmosis membranes. Accordingly, the following formula, which is derived by integrating formula (8) relative to the membrane thickness, is well used.

$$R = \sigma(1 - F)/(1 - \sigma F) \quad (9)$$

wherein $$F = \exp\{-(1 - \sigma)Jv/P\} \quad (10)$$

and R is a true rejection and is defined as follows:

$$R = 1 - Cp/Cm \quad (11)$$

When ΔP is varied, then Lp is computed as in formula (7). When R is measured while Jv is varied and when formulae (9) and (10) are curve-fitted relative to the plotting of R and 1/Jv, then P and σ can be obtained at the same time.

The porous substrate film in the composite membrane of the present invention does not substantially have separating performance of ions, etc., and is used for reinforcing the separating functional layer which substantially has separating performance of the membrane. The pore size and the pore distribution in the porous substrate film are not particularly limited. For example, it is preferable that the substrate film has uniform pores, or has pores distributed in such a manner that their size gradually increases from the side of the film face coated with the separating functional layer to the other side thereof and the pore size on the side of the separating functional layer-coated face of the film is preferably from 0.1 to 100 nm.

The material and the shape of the porous substrate film are not also particularly limited. For example, preferred are polysulfone, cellulose acetate, polyvinyl chloride or their mixtures reinforced with a fabric which comprises, as a main component, at least one selected from polyester and aromatic polyamide. Polysulfone having high chemical, mechanical and thermal stability is especially preferred for the used material.

Specifically, polysulfone having a repeating unit of a chemical formula described below is more preferred, since its pore size control is easy and its dimensional stability is high.

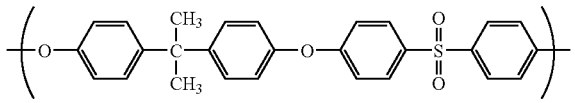

For example, an N,N-dimethylformamide (DMF) solution of the polysulfone is cast onto a base material, such as a densely-woven or nonwoven fabric of polyester, to form thereon a layer having a predetermined thickness, followed by wet-solidification in water to give a porous substrate film. The major part of the surface of the substrate film thus formed has pores having a diameter of 10 nm or less.

The thickness of the aforesaid porous substrate film and of the base material will affect the strength of the composite semipermeable membrane and the packing density when an element is produced. In order to obtain sufficient mechanical strength and packing density, it is preferably from 50 to 300 μm, and more preferably from 100 to 250 μm. Furthermore, the thickness of the porous substrate is preferably from 10 to 200 μm, and more preferably from 30 to 100 μm.

The porous substrate film formation can be observed by means of a scanning electron microscope, a transmission electron microscope or an atomic force microscope. For example, where observation is carried out with a scanning electron microscope, the porous substrate is peeled away from the base material, after which it is sectioned by a freeze-sectioning method, to produce the sample for observation of the cross-section. This sample is thinly coated with platinum, platinum-palladium or ruthenium tetroxide, preferably with ruthenium tetroxide, and observation carried out with a high resolution field emission type scanning electron microscope (UHR-FE-SEM) at an acceleration voltage of 3 to 6 kV. For the high resolution field emission type scanning electron microscope, there can be used for example a model S-900 type electron microscope made by Hitachi Ltd. The film thickness of the porous substrate and the diameter of the surface pores is determined from the electron micrograph obtained. Now, the thickness and pore diameter referred to in the present invention are average values.

Next, methods for producing the composite semipermeable membrane of the present invention are described below.

The backbone of the separating functional layer which constitutes the composite semipermeable membrane can be formed, for example, on the surface of a porous substrate film, by interfacial polycondensation of an aqueous solution comprising the above-described polyfunctional amine and a solution of a water-immiscible organic solvent comprising polyfunctional acid halide.

The concentration of the polyfunctional amine in the aqueous solution comprising polyfunctional amine is preferably 2.5 to 10% by weight, and more preferably 3 to 5% by weight. When the concentration is within this range, sufficient salt removal performance and water permeability can be obtained to thereby achieve a TDS transmission coefficient of $3 \times 10^{-8}$ m/s or less. The aqueous solution comprising polyfunctional amine can contain any other surfactant, organic solvent, alkaline compound and antioxidant not interfering with the reaction of the polyfunctional amine with the polyfunctional acid halide. The surfactant improves the wettability of the surface of the porous substrate film, and is effective for reducing the surface tension between the aqueous amine solution and a non-polar solvent. The organic solvent may act as a catalyst for interfacial polycondensation, and adding it to the reaction system may promote the interfacial polycondensation.

In order to carry out the interfacial polycondensation on the porous substrate film, the above-described aqueous solution of polyfunctional amine is first brought into contact with the film. Preferably, the solution is uniformly and continuously brought into contact with the surface of the film. Specifically, for example, the porous substrate film can be coated with or dipped in the aqueous solution comprising polyfunctional amine. The contact time between the porous substrate film and the aqueous solution comprising polyfunctional amine is preferably from 1 to 10 minutes, and more preferably from 1 to 3 minutes.

After the aqueous solution comprising polyfunctional amine has been contacted with the porous substrate film, the film is well dewatered so that no liquid drops remain on the film. The well dewatering can inhibit decrease of the film performance such that some liquid drops remained on the film become face defects. The dewatering can be carried out, for example, as described in JP-A-2-78428. Specifically, the porous substrate film is, after contacted with the aqueous solution comprising polyfunctional amine, held vertically so that the excess aqueous solution is made to spontaneously flow downward; or it is exposed to nitrogen air or the like that is blowing toward it through an air nozzle to thereby forcedly dewater it. After thus dewatered, the film surface can be dried to remove a part of the water in the aqueous solution.

Next, the substrate film is, after thus contacted with the aqueous solution comprising polyfunctional amine, further contacted with an organic solvent solution comprising a polyfunctional acid halide to thereby form the skeleton of a crosslinked separating functional layer comprising polyamide by means of interfacial polycondensation.

The concentration of the polyfunctional acid halide in the organic solvent solution is preferably from 0.01 to 10% by weight, and more preferably from 0.2 to 2.0% by weight. When the concentration is within this range, sufficient reaction rate can be obtained and side reactions can be inhibited. Furthermore, an acylation catalyst, such as N,N-dimethylformamide, is preferably added to the organic solvent solution to thereby promote the interfacial polycondensation.

Preferably, the organic solvent is immiscible with water, dissolves acid halides, and does not break the porous substrate film. For it, employable is any one inert to amino compounds and acid halides. Preferred examples include hydrocarbon compounds, such as n-hexane, n-octane, and n-decane.

A method for contacting the organic solvent solution comprising polyfunctional acid halide with the phase of the aqueous amino compound solution can be carried out in the same manner as the method for coating the porous substrate film with the aqueous solution comprising polyfunctional amine.

After the organic solvent solution comprising acid halide is brought into contact with the phase of the aqueous amino compound solution for interfacial polycondensation to form a separating functional layer comprising crosslinked polyamide on the porous substrate film in the manner as above, it is preferred that the excess solvent is removed from the film. For removing it, for example, the film is held vertically so that the excess organic solvent is made to spontaneously flow downward. In this case, the time for which the film is held vertically is preferably from 1 to 5 minutes, and more preferably from 1 to 3 minutes. When the time is within this range, the separating functional layer can be completely formed, and defects caused by over-drying of the layer are not caused.

In the method of producing the composite semipermeable membrane of the present invention, the separating functional layer comprising crosslinked polyamide is formed on the porous substrate film, for example, by contacting the above-described organic solvent solution comprising polyfunctional acid halide and acid halide selected from the above formulae (4) to (6), or contacting the above-described polyfunctional acid halide with the substrate film after the contact of the above aqueous solution of polyfunctional acid halide for interfacial polycondensation, and then further contacting an organic solvent solution comprising acid halide selected from the above formulae (4) to (6).

In this case, the concentration of the polyfunctional acid halide in the organic solvent solution is also preferably from 0.01 to 10% by weight, more preferably from 0.02 to 2% by weight. When the concentration is 0.01% by weight or more, sufficient reaction rate can be obtained. When it is 10% by weight or less, side reactions can be inhibited. Furthermore, an acylation catalyst such as N,N-dimethylformamide is preferably added to the organic solvent solution for promoting the interfacial polycondensation.

When the acid halide selected from the above formula (4) to (6) is brought into contact with the substrate film after a substantial separating functional layer has been formed by means of interfacial polycondensation of the polyfunctional amine and the polyfunctional acid halide, its concentration is preferably at least 5 mol % per the polyfunctional acid halide. When the concentration is 5 mol % or more, the boron removal performance which is the effect of the present invention can be sufficiently obtained. When it is 100 mol % or less, deterioration of the environment due to non-reacted reagents can be inhibited without increasing economical costs for treating the reagents. Thus, the concentration is preferably 100 mol % or less. Also, the concentration is more preferably 5 to 50 mol %. On the other hand, when the polyfunctional acid halide and the acid halide are mixed in the same organic solvent solution to form the separating functional layer, the concentration of the acid halide is preferably from 1 to 50 mol %, and more preferably from 1 to 30 mol %, per the polyfunctional acid halide. When the concentration is 1 mol % or more, the boron removal performance which is the object of the present invention can be sufficiently obtained. When it is 50 mol % or less, decrease of the salt removal performance and the permeation flow rate can be inhibited.

The composite semipermeable membrane obtained by the above method can have improved removal performance and water permeability of the composite semipermeable membrane by adding a hot water treatment step at 50 to 150° C., preferably 70 to 130° C., for 1 to 10 minutes, preferably 2 to 8 minutes, or the like.

The composite semipermeable membrane thus formed of the present invention is favorable for a spiral, composite semipermeable membrane element, in which the membrane of the present invention is wound around a water collector tube having a large number of holes formed therethrough, along with a crude water pass material such as plastic net and a permeate water pass material such as tricot and optionally a film for increasing the pressure resistance of the element. The elements can be connected in series or in parallel and housed in a pressure container to construct a composite semipermeable membrane module.

The composite semipermeable membrane and its element and module can be combined with a pump for feeding crude water thereto and with a equipment for crude water pretreatment to construct a fluid separation equipment. By using the separation equipment, crude water can be separated into permeate water such as drinking water and concentrated water not having permeated through the membrane, and the objective water can be obtained.

When the operation pressure to the fluid separation equipment is high, the boron removal ratio becomes high, but the energy necessary for operation becomes also high. Therefore, in consideration of the durability of the composite semipermeable membrane, the operation pressure under which crude water is led to pass through the membrane is preferably from 1.0 to 10 MPa. When the temperature of crude water to be treated is high, the boron removal ratio is increased; but when the temperature is low, the membrane permeation flow rate is decreased. Therefore, the temperature is preferably from 5° C. to 45° C. When the pH of crude water is high, boron in the crude water is dissociated into a boride ion so that the boron removal ratio is increased. However, high-brackish water such as seawater may form scale of magnesium and high-pH water may worsen the membrane. Therefore, it is preferable that the equipment is operated in a neutral region.

The present invention is explained below in detail based on Examples and Comparative Examples. Unless otherwise indicated, "%" is "% by weight".

The measurements in Examples and Comparative Examples were carried out as follows:

Salt Removal Ratio:

Seawater controlled to have a temperature of 25° C. and a pH of 6.5 (and having a TDS concentration of about 3.5% and a boron concentration of about 5.0 ppm) is applied to a composite semipermeable membrane under an operation pressure of 5.5 MPa, and the salt concentration in the permeate is measured. The salt removal through the membrane is determined according to the following formula:

Salt removal ratio=100×{1−(salt concentration in permeate/salt concentration in seawater)}.

Membrane Permeation Flow Rate:

Seawater is applied to a composite semipermeable membrane, and the amount ($m^3$) of the permeate through $m^2$ of the membrane a day indicates the membrane permeation flow rate ($m^3/m^2 \cdot day$).

Boron Removal Ratio:

The boron concentrations in crude water and permeate are measured with an ICP emission spectrophotometer, and the boron rejection is determined as follows:

Boron removal ratio=100×{1−(boron concentration in permeate/boron concentration in crude water)}.

TDS Transmission Coefficient:

The TDS transmission coefficient is determined according to the following formula described in *Compendium of Membrane Separation Technology* (*Maku Shori Gijyutsu Taikei*), The first volume, p. 171, edited by Masayuki Nakagaki, published by Fuji-technosystem (1991):

TDS transmission coefficient (m/s)={(100−salt removal ratio)/salt removal ratio}×membrane permeation flow rate×$115.7 \times 10^{-7}$ Membrane Evaluation Method:

The presence of an acyl group selected from the above formulae (1) to (3) can be analyzed by measuring solid NMR spectrum of a sample in which the separating functional layer has been removed from the substrate film or by measuring HPLC or $^1$H-NMR spectrum of the sample which has been hydrolyzed by heating in an aqueous strong alkaline solution.

Positron Annihilation Lifetime Spectroscopy by Positron Beam Method:

When the positron annihilation lifetime spectroscopy of the separating functional layer in the composite semipermeable membrane is measured without any processing, the measurement can be carried out by using a positron beam method as follows. Specifically, the separating functional layer is dried under reduced pressure at room temperature, and cut out to a square of 1.5 cm×1.5 cm as a test sample. In a thin membrane-corresponding positron annihilation lifetime spectroscopy device equipped with a positron beam generator (the device is explained in detail, for example, in *Radiation Physics and Chemistiy,* 58, 603, Pergamon (2000)), the test sample is measured at a beam intensity of 1 keV and at room temperature in vacuo and at a total count number of 5,000,000 with a scintillation counter made of barium bifluoride using a photomultiplier, and the analysis is carried out by POSITRONFIT. The mean pore radius R, the mean pore volume V, the relative intensity I and the vacancy content V×I can be analyzed from the mean lifetime τ of the fourth component obtained by the analysis.

EXAMPLES 1 TO 14 and COMPARATIVE EXAMPLES 1 to 4

A dimethylformamide (DMF) solution of 15.3% polysulfone was cast on polyester nonwoven fabric (permeability: 0.5 to 1 cc/cm$^2$·sec) at room temperature (25° C.) to a thickness of 200 μm, then immediately dipped in pure water and left therein for 5 minutes to prepare a porous substrate film. The thus formed porous substrate film (thickness: 210 to 215 μm) was dipped in an aqueous solution of 3.4% methaphenylenediamine (hereinafter referred to as "mPDA") for 2 minutes, then gradually pulled up in the vertical direction, exposed to nitrogen blow from an air nozzle to thereby remove the excess solution from the surface of the substrate film, and then an n-decane solution containing 0.15% trimesic acid chloride (hereinafter referred to as "TMC") and the acid halide described in Table 2 (the chemical structures of Compounds 1 to 17 are described in Table 1) at an amount of 20 mol % per TMC was applied thereto so as to completely wet its surface, and kept as such for 1 minute. Next the film was vertically held for 1 minutes so as to remove the excess solution from it, and the film was dewatered. Next, this was washed with hot water at 90° C. for 2 minutes, and dipped in an aqueous solution of sodium hypochlorite which had been controlled to have a pH of 7 and a chlorine concentration of 200 mg/liter, for 2 minutes, and then in an aqueous solution having a sodium hydrogensulfite concentration of 1,000 mg/liter to reduce and remove the excess sodium hypochlorite. Furthermore, the film was again washed with hot water at 95° C. for 2 minutes. The composite semipermeable membranes thus obtained were evaluated, and the membrane permeation flow rate, salt removal ratio, boron removal ratio and TDS transmission coefficient are shown in Table 2. The relationship between the membrane permeation flow rate and the boron removal ratio is shown in FIG. 1.

TABLE 1

| Compound No. | Structure |
|---|---|
| 1 | Cl-C(=O)-CH2-OMe |
| 2 | Cl-C(=O)-CH2-OPh |
| 3 | Cl-C(=O)-CH(CH3)-Cl |
| 4 | Cl-C(=O)-CH(CH3)-Br |
| 5 | Cl-C(=O)-CF2-CF2-CF3 |
| 6 | Cl-C(=O)-CH(CH3)-OPh |
| 7 | Cl-C(=O)-CH(CH2CH3)-OPh |
| 8 | Cl-C(=O)-CH2-O-C6H4-Cl |
| 9 | Cl-C(=O)-CH2-O-C(=O)-CH3 |
| 10 | Cl-C(=O)-CH2-CCl3 |
| 11 | Cl-C(=O)-CH2-O-(menthyl) |

TABLE 1-continued

| Compound No. | Structure |
|---|---|
| 12 | (isoxazole-5-carbonyl chloride) |
| 13 | ClCH2C(O)SPh |
| 14 | ClCH2C(O)OCH2Ph |
| 15 | CH3CH2CH2C(O)Cl |
| 16 | Cl-C(O)-C(CH3)2-O-C(O)CH3 |
| 17 | 2-methoxybenzoyl chloride |

TABLE 2

| | Added acid halide (per TMC mole concentration) | Membrane permeation flow rate (m³/m²/d) | Salt removal ratio (%) | Boron removal ratio (%) | TDS transmission coefficient (×10⁻⁸ m/sec) |
|---|---|---|---|---|---|
| Ex. 1 | Compound 1 (20 mol %) | 0.79 | 99.88 | 93.22 | 1.10 |
| Ex. 2 | Compound 2 (20 mol %) | 0.35 | 99.94 | 96.72 | 0.25 |
| Ex. 3 | Compound 3 (20 mol %) | 0.74 | 99.92 | 94.18 | 0.69 |
| Ex. 4 | Compound 4 (20 mol %) | 0.97 | 99.89 | 92.32 | 1.20 |
| Ex. 5 | Compound 5 (20 mol %) | 0.80 | 99.93 | 92.82 | 0.66 |
| Ex. 6 | Compound 6 (20 mol %) | 0.60 | 99.88 | 94.95 | 0.82 |
| Ex. 7 | Compound 7 (20 mol %) | 0.97 | 99.87 | 92.29 | 1.46 |
| Ex. 8 | Compound 8 (20 mol %) | 0.24 | 99.79 | 97.59 | 0.58 |
| Ex. 9 | Compound 9 (20 mol %) | 0.73 | 99.85 | 93.16 | 1.25 |
| Ex. 10 | Compound 10 (20 mol %) | 0.66 | 99.91 | 94.85 | 0.68 |
| Ex. 11 | Compound 11 (20 mol %) | 0.38 | 99.93 | 96.11 | 0.29 |
| Ex. 12 | Compound 12 (20 mol %) | 0.96 | 99.86 | 92.76 | 1.55 |
| Ex. 13 | Compound 13 (20 mol %) | 0.49 | 99.91 | 95.52 | 0.52 |
| Ex. 14 | Compound 14 (20 mol %) | 0.41 | 99.92 | 95.13 | 0.41 |
| Comp. Ex. 1 | None | 1.02 | 99.89 | 89.54 | 1.17 |
| Comp. Ex. 2 | Compound 15 (20 mol %) | 1.22 | 99.90 | 90.61 | 1.48 |
| Comp. Ex. 3 | Compound 16 (20 mol %) | 1.33 | 99.85 | 88.07 | 2.31 |
| Comp. Ex. 4 | Compound 17 (20 mol %) | 0.93 | 99.88 | 89.69 | 1.32 |

EXAMPLES 15 TO 21

Each of composite semipermeable membranes was produced in the same manner as in Examples 1 to 14 and Comparative Examples 1 to 4, except for using acid chloride in the n-decane solution of 0.15% TMC at a concentration described in Table 3 The composite semipermeable membranes were evaluated, and the physical data of membrane permeation flow rate, salt removal ratio, boron removal ratio, and TDS transmission coefficient are shown in Table 3.

TABLE 3

| | Added acid halide (per TMC mole concentration) | Membrane permeation flow rate (m³/m²/d) | Salt removal ratio (%) | Boron removal ratio (%) | TDS transmission coefficient (×10⁻⁸ m/sec) |
|---|---|---|---|---|---|
| Ex. 15 | Compound 8 (1 mol %) | 0.85 | 99.90 | 92.99 | 1.02 |
| Ex. 16 | Compound 8 (3 mol %) | 0.72 | 99.85 | 94.48 | 1.21 |
| Ex. 17 | Compound 2 (5 mol %) | 0.86 | 99.94 | 93.20 | 0.64 |
| Ex. 18 | Compound 2 (10 mol %) | 0.59 | 99.87 | 95.00 | 0.88 |
| Ex. 19 | Compound 2 (30 mol %) | 0.13 | 99.13 | 96.05 | 1.32 |

TABLE 3-continued

| | Added acid halide (per TMC mole concentration) | Membrane permeation flow rate $(m^3/m^2/d)$ | Salt removal ratio (%) | Boron removal ratio (%) | TDS transmission coefficient $(\times 10^{-8}\ m/sec)$ |
|---|---|---|---|---|---|
| Ex. 20 | Compound 4 (50 mol %) | 0.38 | 99.84 | 96.36 | 0.71 |
| Ex. 21 | Compound 7 (50 mol %) | 0.45 | 99.93 | 95.51 | 0.37 |

EXAMPLES 22 TO 25

The same porous substrate film as in Examples 1 to 21 and Comparative Examples 1 to 4 was dipped in an aqueous solution of 3.4% mPDA for 2 minutes, then gradually pulled up in the vertical direction, exposed to nitrogen blow from an air nozzle to thereby remove the excess solution from the surface of the substrate film, and then an n-decane solution of 0.15% TMC was applied thereto so as to completely wet its surface, and kept as such for 1 minute. Next, the film was vertically held for 1 minute and dewatered. Next, an n-decane solution of acid chloride in Table 4 was applied thereto so as to completely wet its surface, and kept as such for 1 minute. Next, the film was vertically held for 1 minute and dewatered. Next, this was dried in air to remove the decane solvent, and then washed with running tap water so as to remove the chemicals remaining in the film. Then, this was washed with hot water at 90° C. for 2 minutes, and dipped in an aqueous solution of sodium hypochlorite which had been controlled to have a pH of 7 and a chlorine concentration of 200 mg/liter, for 2 minutes, and then in an aqueous solution containing 1,000 mg/liter of sodium hydrogensulfite. Furthermore, the film was again washed with hot water at 95° C. for 2 minutes.

The composite semipermeable membranes thus obtained were evaluated, and the membrane permeation flow rate, salt removal ratio, boron removal ratio, and TDS transmission coefficient are shown in Table 4.

TABLE 4

| | Added acid halide (per TMC mole concentration) | Membrane permeation flow rate $(m^3/m^2/d)$ | Salt removal ratio (%) | Boron removal ratio (%) | TDS transmission coefficient $(\times 10^{-8}\ m/sec)$ |
|---|---|---|---|---|---|
| Ex. 22 | Compound 2 (5 mol %) | 1.00 | 99.90 | 91.17 | 1.14 |
| Ex. 23 | Compound 2 (20 mol %) | 0.98 | 99.85 | 90.69 | 1.70 |
| Ex. 24 | Compound 2 (50 mol %) | 0.85 | 99.89 | 91.22 | 1.10 |
| Ex. 25 | Compound 2 (100 mol %) | 0.94 | 99.83 | 90.32 | 1.87 |

EXAMPLE 26

The positron annihilation lifetime spectroscopy by the positron beam method and the evaluation of membrane permeability were carried out for the composite semipermeable membrane produced in Example 18. The results are shows in Table 5 and FIG. 2.

COMPARATIVE EXAMPLE 5

The same porous substrate film as in Examples 1 to 25 and Comparative Examples 1 to 4 was dipped in an aqueous solution of 3.4% mPDA for 2 minutes, then gradually pulled up in the vertical direction, exposed to nitrogen blow from an air nozzle to thereby remove the excess solution from the surface of the substrate film, and then an n-decane solution of 0.165% TMC was applied thereto so as to completely wet its surface, and kept as such for 1 minute. Next, the film was vertically held for 1 minute and dewatered. Next, this was dried in air to remove the decane solvent, and then washed with running tap water so as to remove the chemicals remaining in the film. Then, this was washed with hot water at 90° C. for 2 minutes, and dipped in an aqueous solution of sodium hypochlorite which had been controlled to have a pH of 7 and a chlorine concentration of 200 mg/liter, for 2 minutes, and then in an aqueous solution containing 1,000 mg/liter of sodium hydrogensulfite. Furthermore, the film was again washed with hot water at 95° C. for 2 minutes.

Figure 2:
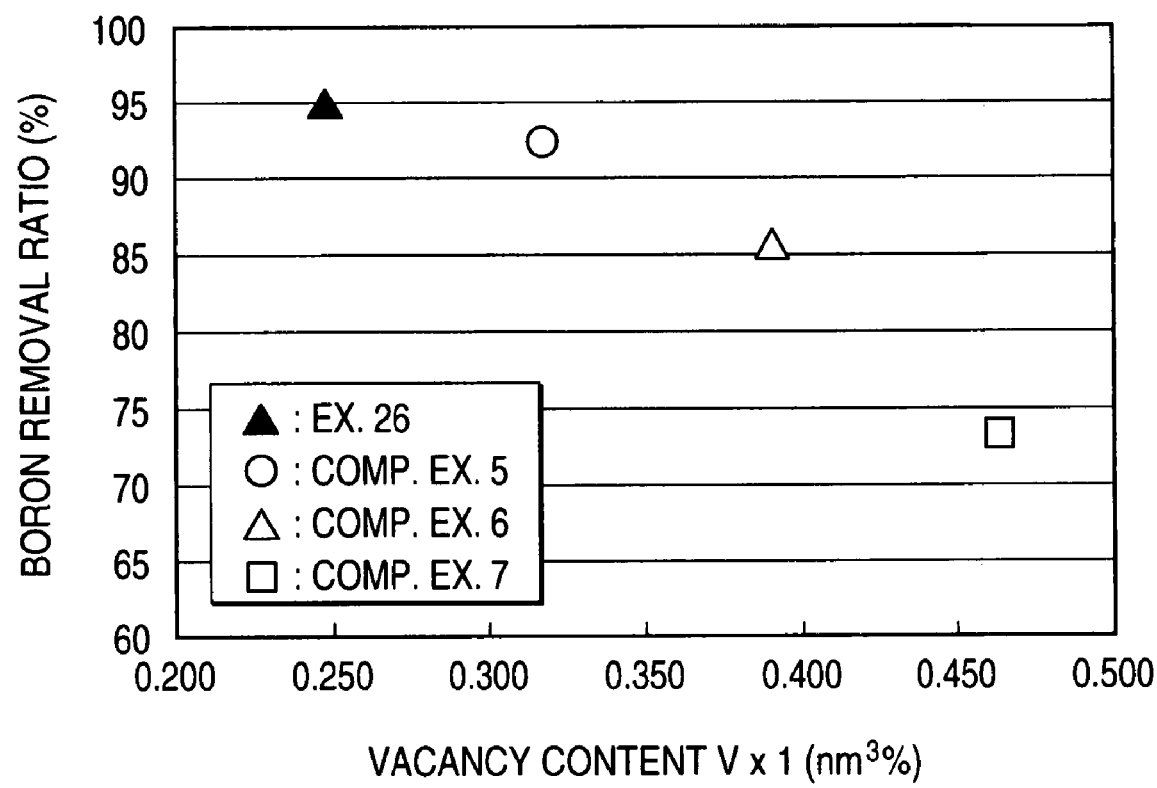
FIG. 2 is a graph showing the relationship between the vacancy content V×I and the boron removal ratio of the separating functional layer in the composite semipermeable membranes produced in Example 26 and Comparative Examples 5 to 7.

The positron annihilation lifetime spectroscopy and the evaluation of membrane permeability of the composite semipermeable membranes thus obtained were carried out in the same manner as in Example 26 and the results are shows in Table 5 and FIG. 2.

COMPARATIVE EXAMPLE 6

The same porous substrate film as in Examples 1 to 25 and Comparative Examples 1 to 4 was dipped in an aqueous solution of 0.55% triaminobenzene, 1.45% mPDA and 0.15% ethylenediamine for 2 minutes, then gradually pulled up in the vertical direction, exposed to nitrogen blow from an air nozzle to thereby remove the excess solution from the surface of the substrate film, and then an n-decane solution of 0.0675% TMC and 0.0825% terephthaloyl chloride was applied thereto so as to completely wet its surface, and kept as such for 1 minute. Next, the film was vertically held for 1 minute and dewatered. Next, this was dried in air to remove the decane solvent, dipped in an aqueous solution of 1% sodium carbonate and 0.3% sodium dodecyl sulfate for 5 minutes, and then washed with running tap water so as to remove the chemicals remaining in the film. Then, this was washed with hot water at 70° C. for 2 minutes, and dipped in an aqueous solution of sodium hypochlorite which had been controlled to have a pH of 7 and a chlorine concentration of 500 mg/liter, for 2 minutes, and then in an aqueous solution containing 1,000 mg/liter of sodium hydrogensulfite.

The positron annihilation lifetime spectroscopy and the evaluation of membrane permeability of the composite semipermeable membranes thus obtained were carried out in the same manner as in Example 26 and the results are shows in Table 5 and FIG. 2.

COMPARATIVE EXAMPLE 7

The same porous substrate film as in Examples 1 to 25 and Comparative Examples 1 to 4 was dipped in an aqueous solution of 0.46% triaminobenzene, 1.2% mPDA, 0.12% ethylenediamine and 1% ε-caprolactam for 2 minutes, then gradually pulled up in the vertical direction, exposed to nitrogen blow from an air nozzle to thereby remove the excess solution from the surface of the substrate film, and then an n-decane solution of 0.1% TMC was applied thereto so as to completely wet its surface, and kept as such for 1 minute. Next, the film was vertically held for 1 minute and dewatered. Next, this was dried in air to remove the decane solvent, dipped in an aqueous solution of 1% sodium carbonate and 0.3% sodium dodecyl sulfate for 5 minutes, and then washed with running tap water so as to remove the chemicals remaining in the film. Then, this was washed with hot water at 70° C. for 2 minutes, and dipped in an aqueous solution of sodium hypochlorite which had been controlled to have a pH of 7 and a chlorine concentration of 500 mg/liter, for 2 minutes, and then in an aqueous solution containing 1,000 mg/liter of sodium hydrogensulfite.

The positron annihilation lifetime spectroscopy and the evaluation of membrane permeability of the composite semipermeable membranes thus obtained were carried out in the same manner as in Example 26 and the results are shows in Table 5 and FIG. 2.

TABLE 5

| | Mean lifetime (ns) | Mean pore radius R (nm) | Mean pore volume V (nm³) | Relative intensity I (%) | Vacancy content V × I (nm³ %) | Membrane permeation flow rate (m³/m²/d) | Salt removal ratio (%) | Boron removal ratio (%) |
|---|---|---|---|---|---|---|---|---|
| Ex. 26 | 2.10 | 0.295 | 0.108 | 2.3 | 0.247 | 0.59 | 99.9 | 95.0 |
| Comp. Ex. 5 | 2.47 | 0.325 | 0.144 | 2.2 | 0.316 | 0.68 | 99.9 | 92.1 |
| Comp. Ex. 6 | 2.38 | 0.318 | 0.135 | 2.9 | 0.391 | 0.87 | 99.7 | 86.1 |
| Comp. Ex. 7 | 1.99 | 0.285 | 0.097 | 4.8 | 0.465 | 0.96 | 99.1 | 72.9 |

INDUSTRIAL APPLICABILITY

As described above, the composite semipermeable membrane of the present invention attains high salt removal and high permeate transmission, and rejects even substances which are non-dissociable in a neutral region, such as boron. Accordingly, the membrane is favorable for treatment of cooling water in atomic power plants, for treatment of plating wastes, and for production of drinking water from high-concentration brackish water or seawater.

While the present invention has been described in detail and with reference to specific embodiments thereof, it will be apparent to one of skill in the art that various changes and modifications can be made therein without departing from the spirit and scope thereof. All references cited herein are incorporated in their entirety.

This application is based on Japanese application No. 2004-315955 filed on Oct. 29, 2004, the entire contents of which are incorporated hereinto by reference.

The invention claimed is:

1. A composite semipermeable membrane which comprises a separating functional layer comprising polyamide formed on a porous substrate film, wherein an acyl group selected from formulae (1) to (3) is bound via a covalent bond to a polyamide molecule in the separating functional layer comprising polyamide:

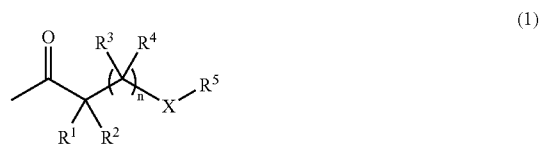
(1)

wherein n represents 0 or 1; X represents O, S or $NR^6$; $R^1$, $R^2$ and $R^6$ each represents a hydrogen atom or an alkyl group having from 1 to 3 carbon atoms, and at least one of $R^1$ and $R^2$ is a hydrogen atom; $R^3$ and $R^4$ each represents a hydrogen atom, or an alkyl group having from 1 to 12 carbon atoms or aromatic group which may have a substituent(s) other than a carboxyl group; $R^5$ represents an alkyl group having from 1 to 12 carbon atoms or aromatic group which may have a substituent(s) other than a carboxyl group; and any atoms of $R^1$, $R^3$, $R^5$ and $R^6$ may form a ring structure via a covalent bond,

(2)

wherein n, $R^1$ and $R^2$ have the same meanings as defined above; Y represents a halogen atom; $R^7$ and $R^8$ each represents a hydrogen atom, a halogen atom, or an alkyl group having 1 to 12 carbon or aromatic group which may have a substituent(s) other than a carboxyl group; and atoms of $R^1$ and $R^7$ may form a ring structure via a covalent bond, and

(3)

wherein R$^9$ represents a 5-membered ring aromatic group having 1 to 12 carbon atoms, has at least two atoms selected from a nitrogen atom, an oxygen atom and a sulfur atom within the ring and may have a substituent(s) other than a carboxyl group.

2. The composite semipermeable membrane according to claim 1,
wherein the separating functional layer comprising polyamide has a mean pore radius of 0.25 nm to 0.35 nm and a vacancy content of 0.2 nm$^3$% to 0.3 nm$^3$%, measured by positron annihilation lifetime spectroscopy.

3. The composite semipermeable membrane according to claim 1, wherein the separating functional layer comprising polyamide comprises crosslinked polyamide formed by means of interfacial polycondensation by contacting, on the porous substrate film, an aqueous solution comprising polyfunctional amine, and an organic solvent solution comprising polyfunctional acid halide and acid halide selected from the following formulae (4) to (6):

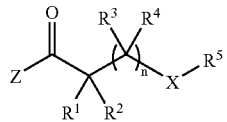

(4)

wherein n represents 0 or 1; X represents O, S or NR$^6$; R$^1$, R$^2$ and R$^6$ each represents a hydrogen atom or an alkyl group having from 1 to 3 carbon atoms, and at least one of R$^1$ and R$^2$ is a hydrogen atom; R$^3$ and R$^4$ each represents a hydrogen atom, or an alkyl group having from 1 to 12 carbon atoms or aromatic group which may have a substituent(s) other than a carboxyl group; R$^5$ represents an alkyl group having from 1 to 12 carbon atoms or aromatic group which may have a substituent(s) other than a carboxyl group; any atoms of R$^1$, R$^3$, R$^5$ and R$^6$ may form a ring structure via a covalent bond, and Z represents a halogen atom,

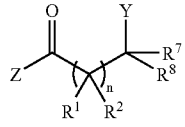

(5)

wherein n, R$^1$ and R$^2$ have the same meanings as defined above; Y represents a halogen atom; R$^7$ and R$^8$ each represents a hydrogen atom, a halogen atom, or an alkyl group having 1 to 12 carbon or aromatic group which may have a substituent(s) other than a carboxyl group; and atoms of R$^1$ and R$^7$ may form a ring structure via a covalent bond, and

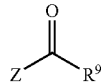

(6)

wherein R$^9$ represents a 5-membered ring aromatic group having 1 to 12 carbon atoms, has at least two atoms selected from a nitrogen atom, an oxygen atom and a sulfur atom within the ring and may have a substituent(s) other than a carboxyl group.

4. The composite semipermeable membrane according to claim 3, wherein the acid halide selected from formulae (4) to (6) is at least one selected from the group consisting of methoxyacetyl chloride, ethoxyacetyl chloride, phenyloxyacetyl chloride, 2-methylphenyloxyacetyl chloride, 2-ethylphenyloxyacetyl chloride, (4-chlorophenyl)oxyacetyl chloride, (phenylthio)acetyl chloride, benzyloxyacetylchloride, 2-fluoropropionyl chloride, 2-chloropropionyl chloride, 2-bromopropionyl chloride, heptafluorobutyryl chloride, acetoxyacetyl chloride, trifluoroacetyl chloride, trichloroacetyl chloride, (–)-menthyloxyacetyl chloride, and isoxazole-5-carbonyl chloride.

5. The composite semipermeable membrane according to claim 1, wherein the separating functional layer comprising polyamide comprises crosslinked polyamide formed by means of interfacial polycondensation by contacting, on the porous substrate film, an aqueous solution comprising polyfunctional amine, an organic solvent solution comprising polyfunctional acid halide, and an organic solvent solution comprising acid halide selected from the following formulae (4) to (6):

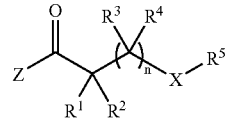

(4)

wherein n represents 0 or 1; X represents O, S or NR$^6$; R$^1$, R$^2$ and R$^6$ each represents a hydrogen atom or an alkyl group having from 1 to 3 carbon atoms, and at least one of R$^1$ and R$^2$ is a hydrogen atom; R$^3$ and R$^4$ each represents a hydrogen atom, or an alkyl group having from 1 to 12 carbon atoms or aromatic group which may have a substituent(s) other than a carboxyl group; R$^5$ represents an alkyl group having from 1 to 12 carbon atoms or aromatic group which may have a substituent(s) other than a carboxyl group; any atoms of R$^1$, R$^3$, R$^5$ and R$^6$ may form a ring structure via a covalent bond, and Z represents a halogen atom,

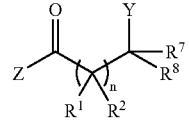

(5)

wherein n, R$^1$ and R$^2$ have the same meanings as defined above; Y represents a halogen atom; R$^7$ and R$^8$ each represents a hydrogen atom, a halogen atom, or an alkyl group having 1 to 12 carbon or aromatic group which may have a substituent(s) other than a carboxyl group; and atoms of R$^1$ and R$^7$ may form a ring structure via a covalent bond, and

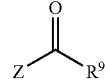

(6)

wherein R$^9$ represents a 5-membered ring aromatic group having 1 to 12 carbon atoms, has at least two atoms selected from a nitrogen atom, an oxygen atom and a sulfur atom within the ring and may have a substituent(s) other than a carboxyl group.

6. The composite semipermeable membrane according to claim 5, wherein the acid halide selected from formulae (4) to (6) is at least one selected from the group consisting of methoxyacetyl chloride, ethoxyacetyl chloride, phenyloxyacetyl chloride, 2-methylphenyloxyacetyl chloride, 2-ethylphenyloxyacetyl chloride, (4-chlorophenyl)oxyacetyl chloride, (phenylthio)acetyl chloride, benzyloxyacetylchloride, 2-fluoropropionyl chloride, 2-chloropropionyl chloride, 2-bromopropionyl chloride, heptafluorobutyryl chloride, acetoxyacetyl chloride, trifluoroacetyl chloride, trichloroacetyl chloride, (−)-menthyloxyacetyl chloride, and isoxazole-5-carbonyl chloride.

7. The composite semipermeable membrane according to claim 1, which satisfies the following relationship when seawater at 25° C. having a pH of 6.5, a boron concentration of 5 ppm and a TDS concentration of 3.5% by weight is permeated under an operation pressure of 5.5 MPa:

Boron removal ratio (%)≧96−4×membrane permeation flow rate (m$^3$/m$^2$·day).

8. The composite semipermeable membrane according to claim 1, which has a membrane permeation flow rate of 0.5 m$^3$/m$^2$·day or more and a boron removal ratio of 94% or more, when seawater at 25° C. having a pH of 6.5, a boron concentration of 5 ppm and a TDS concentration of 3.5% by weight is permeated under an operation pressure of 5.5 MPa.

9. The composite semipermeable membrane according to claim 1, which has a TDS transmission coefficient of 0.1× 10$^{-8}$ m/s to 3×10$^{-8}$ m/s, when seawater at 25° C. having a pH of 6.5, a boron concentration of 5 ppm and a TDS concentration of 3.5% by weight is permeated under an operation pressure of 5.5 MPa.

10. A process for producing the composite semipermeable membrane according to claim 1, which comprises:

contacting an aqueous solution comprising polyfunctional amine which has at least two primary and/or secondary amino groups, with a porous substrate film, contacting a solution of a water-immiscible organic solvent comprising polyfunctional acid halide having at least two acid halide groups to thereby form, on the porous substrate film, a separating functional layer comprising crosslinked polyamide by means of interfacial polycondensation, and contacting an organic solvent solution comprising the acid halide selected from the following formulae (4) to (6):

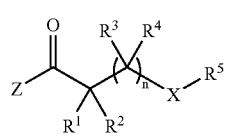

(4)

wherein n represents 0 or 1; X represents O, S or NR$^6$; R$^1$, R$^2$ and R$^6$ each represents a hydrogen atom or an alkyl group having from 1 to 3 carbon atoms, and at least one of R$^1$ and R$^2$ is a hydrogen atom; R$^3$ and R$^4$ each represents a hydrogen atom, or an alkyl group having from 1 to 12 carbon atoms or aromatic group which may have a substituent(s) other than a carboxyl group; R$^5$ represents an alkyl group having from 1 to 12 carbon atoms or aromatic group which may have a substituent(s) other than a carboxyl group; any atoms of R$^1$, R$^3$, R$^5$ and R$^6$ may form a ring structure via a covalent bond, and Z represents a halogen atom,

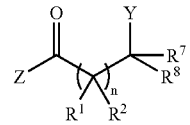

(5)

wherein n, R$^1$ and R$^2$ have the same meanings as defined above; Y represents a halogen atom; R$^7$ and R$^8$ each represents a hydrogen atom, a halogen atom, or an alkyl group having 1 to 12 carbon or aromatic group which may have a substituent(s) other than a carboxyl group; and atoms of R$^1$ and R$^7$ may form a ring structure via a covalent bond, and

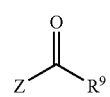

(6)

wherein R$^9$ represents a 5-membered ring aromatic group having 1 to 12 carbon atoms, has at least two atoms selected from a nitrogen atom, an oxygen atom and a sulfur atom within the ring and may have a substituent(s) other than a carboxyl group, at an amount of 5 mol % or more per the polyfunctional acid halide with the separating functional layer.

11. A process for producing the composite semipermeable membrane according to claim 1, which comprises:

contacting an aqueous solution comprising polyfunctional amine which has at least two primary and/or secondary amino groups, with a porous substrate film, contacting a solution of a water-immiscible organic solvent comprising polyfunctional acid halide having at least two acid halide groups and the acid halide selected from the following formulae (4) to (6):

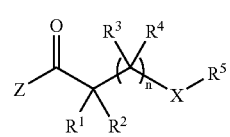

(4)

wherein n represents 0 or 1; X represents O, S or NR$^6$; R$^1$, R$^2$ and R$^6$ each represents a hydrogen atom or an alkyl group having from 1 to 3 carbon atoms, and at least one of R$^1$ and R$^2$ is a hydrogen atom; R$^3$ and R$^4$ each represents a hydrogen atom, or an alkyl group having from 1 to 12 carbon atoms or aromatic group which may have a substituent(s) other than a carboxyl group; R$^5$ represents an alkyl group having from 1 to 12 carbon atoms or aromatic group which may have a substituent(s) other than a carboxyl group; any atoms of R$^1$, R$^3$, R$^5$ and R$^6$ may form a ring structure via a covalent bond, and Z represents a halogen atom,

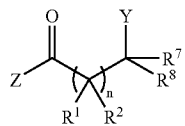 (5)

wherein n, $R^1$ and $R^2$ have the same meanings as defined above; Y represents a halogen atom; $R^7$ and $R^8$ each represents a hydrogen atom, a halogen atom, or an alkyl group having 1 to 12 carbon or aromatic group which may have a substituent(s) other than a carboxyl group; and atoms of $R^1$ and $R^7$ may form a ring structure via a covalent bond, and

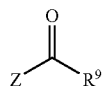 (6)

wherein $R^9$ represents a 5-membered ring aromatic group having 1 to 12 carbon atoms, has at least two atoms selected from a nitrogen atom, an oxygen atom and a sulfur atom within the ring and may have a substituent(s) other than a carboxyl group, at an amount of 1 to 50 mol % per the polyfunctional acid halide to thereby form, on the porous substrate film, a separating functional layer comprising crosslinked polyamide by means of interfacial polycondensation.

12. A composite semipermeable membrane element which comprises the composite semipermeable membrane according to claim 1.

13. A fluid separation equipment which comprises the composite semipermeable membrane element according to claim 12.

14. A method for water treatment, which comprises using the composite semipermeable membrane according to claim 1.

* * * * *